United States Patent
Akiyama

(10) Patent No.: US 12,387,744 B2
(45) Date of Patent: Aug. 12, 2025

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Minoru Akiyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 425 days.

(21) Appl. No.: 17/875,427

(22) Filed: Jul. 28, 2022

(65) Prior Publication Data
US 2023/0298613 A1   Sep. 21, 2023

(30) Foreign Application Priority Data
Mar. 15, 2022 (JP) ................ 2022-040027

(51) Int. Cl.
*G10L 25/51* (2013.01)
*G06F 21/62* (2013.01)
*G06Q 10/00* (2023.01)
*G06Q 10/06* (2023.01)

(52) U.S. Cl.
CPC .......... *G10L 25/51* (2013.01); *G06F 21/6245* (2013.01)

(58) Field of Classification Search
CPC ..... G10L 25/51; G06F 21/6242; G06Q 10/06; G06Q 10/00
USPC .............................................. 381/56, 58, 77
See application file for complete search history.

(56) References Cited

U.S. PATENT DOCUMENTS

| | | | |
|---|---|---|---|
| 7,697,510 B2 | 4/2010 | Tanimoto | |
| 9,557,698 B2 * | 1/2017 | Muramoto | G03G 15/5062 |
| 10,362,180 B2 | 7/2019 | Miyamori et al. | |

FOREIGN PATENT DOCUMENTS

| | | |
|---|---|---|
| JP | H0568176 | 9/1993 |
| JP | 2006332889 | 12/2006 |
| JP | 2008092358 | 4/2008 |
| JP | 4706890 | 6/2011 |
| JP | 4810389 | 11/2011 |
| JP | 6868176 | 5/2021 |

OTHER PUBLICATIONS

"Search Report of Europe Counterpart Application", issued on May 15, 2023, p. 1-p. 12.

* cited by examiner

*Primary Examiner* — Thjuan K Addy
(74) *Attorney, Agent, or Firm* — JCIPRNET

(57) ABSTRACT

An information processing apparatus includes a processor configured to: acquire operation sound data being data obtained by recording an operation sound of a target apparatus used in an organization; detect an abnormal sound from the operation sound data; and transmit partial operation sound data to an out-of-organization processing apparatus, and not transmit a portion of the operation sound data other than the partial operation sound data to the out-of-organization processing apparatus, the partial operation sound data being data that contains the abnormal sound and is a portion of the operation sound data, and the out-of-organization processing apparatus being an apparatus that is managed outside the organization and executes a process related to the abnormal sound.

7 Claims, 5 Drawing Sheets

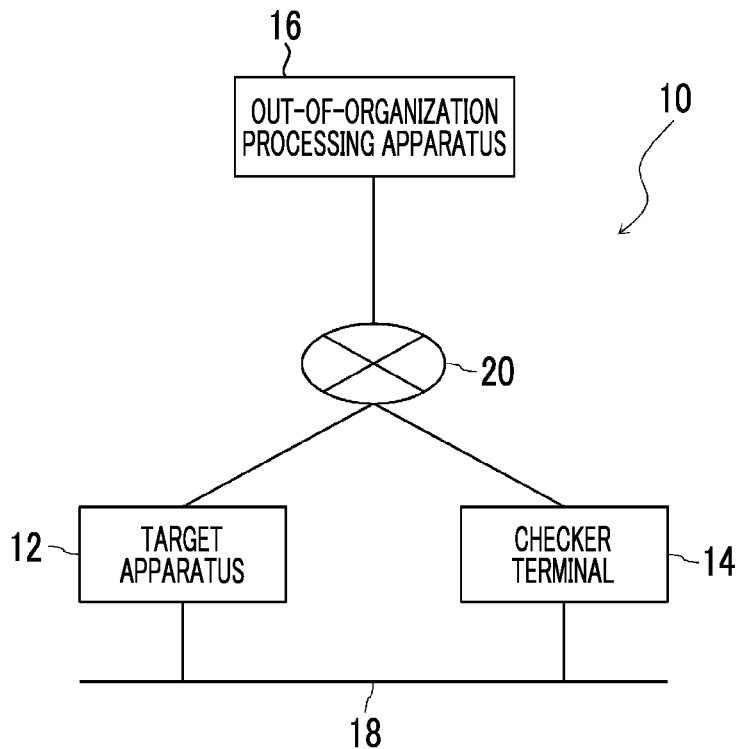
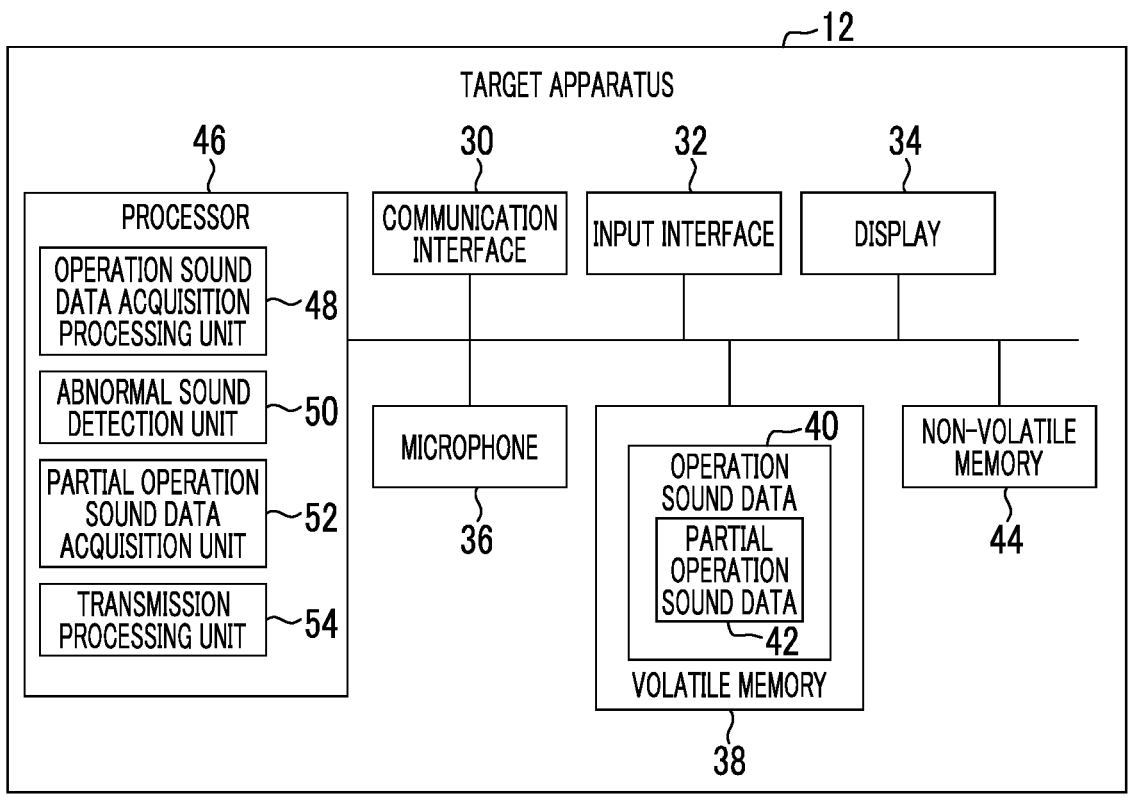

FIG. 3

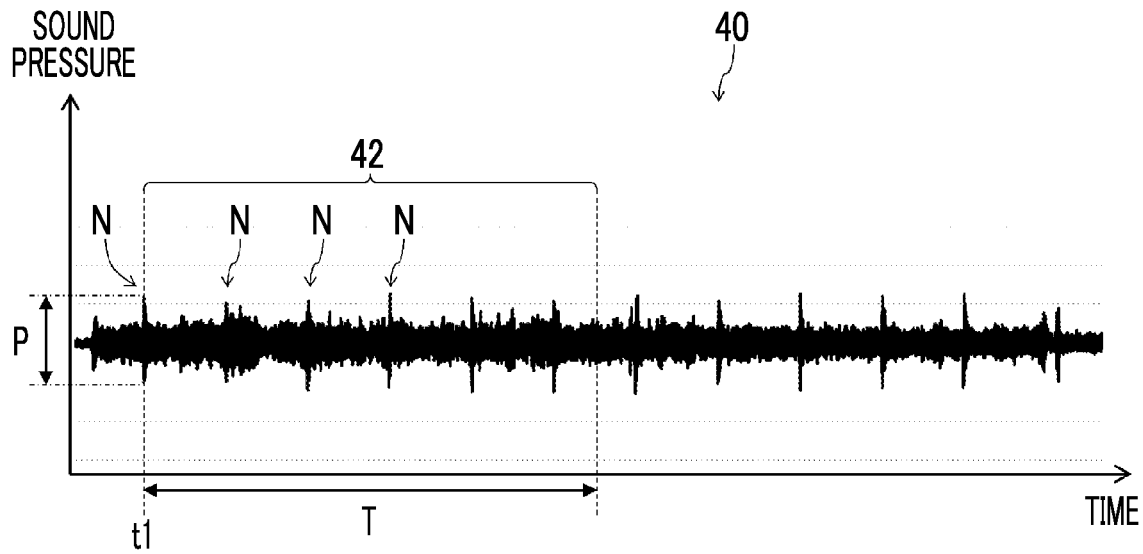

FIG. 4

ABNORMAL SOUND HAS OCCURRED.
SORRY TO BOTHER YOU,
BUT PLEASE CHECK WHETHER INDIVIDUAL INFORMATION,
CONFIDENTIAL INFORMATION, OR THE LIKE IS NOT CONTAINED
IN ATTACHED OPERATION SOUND FILE.
IN CASE WHERE THERE IS NO PROBLEM IN TRANSMISSION,
PLEASE TRANSMIT TO FOLLOWING ADDRESS.
Support_diagnosis@fuji.co.jp OCCURRENCE DATE: 04.01.2022_15.45
MODEL NUMBER: 12345
SERIAL NUMBER: 0123-4567
Job INFORMATION: PRINT

FIG. 5

ABNORMAL SOUND HAS OCCURRED.
SORRY TO BOTHER YOU,
BUT PLEASE CHECK WHETHER INDIVIDUAL INFORMATION,
CONFIDENTIAL INFORMATION, OR THE LIKE IS NOT CONTAINED
IN FOLLOWING OPERATION SOUND FILE.
IN CASE WHERE THERE IS NO PROBLEM IN REGISTRATION,
PLEASE PRESS TRANSMIT BUTTON.

¥¥aaa.bb.com¥admin¥print_2022_04_01_15_45_Level1.wav

OCCURRENCE DATE: 04.01.2022_15.45
MODEL NUMBER: 12345
SERIAL NUMBER: 0123-4567
Job INFORMATION: PRINT

[ TRANSMIT ]   [ CANCEL ]

FIG. 6

ABNORMAL SOUND HAS OCCURRED.
SORRY TO BOTHER YOU, BUT PLEASE CHECK WHETHER
INDIVIDUAL INFORMATION, CONFIDENTIAL INFORMATION,
OR THE LIKE IS NOT CONTAINE
IN FOLLOWING OPERATION SOUND FILE.
IN CASE WHERE THERE IS NO PROBLEM IN TRANSMISSION,
PLEASE REGISTER IN FOLLOWING HOME PAGES.
https://www.fuji.co.jp/support/diagnosis PRIORITY 1: ¥¥aaa.bb.com¥admin¥print_2022_04_01_15_45_Level1.wav
PRIORITY 2: ¥¥aaa.bb.com¥admin¥copy_2022_04_01_15_51_Level2.wav
PRIORITY 3: ¥¥aaa.bb.com¥admin¥print_2022_04_01_15_28_Level3.wav
PRIORITY 4: ¥¥aaa.bb.com¥admin¥copy_2022_04_01_16_02_Level1.wav

ONE OPERATION SOUND FILE MAY BE REGISTERED.

MODEL NUMBER: 12345
SERIAL NUMBER: 0123-4567

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-040027 filed Mar. 15, 2022.

BACKGROUND

(i) Technical Field

The present invention relates to an information processing apparatus, a non-transitory computer readable medium storing an information processing program, and an information processing method.

(ii) Related Art

JP4810389B, JP2006-332889A, and JP4706890B disclose an apparatus that detects an occurrence of a failure or a problem in a target apparatus as a target for grasping a situation of the failure or the occurrence of the problem, based on sound recorded data obtained by recording a sound emitted by the target apparatus. Further, JP6868176B discloses a diagnostic apparatus that diagnoses a target apparatus to be diagnosed, based on sound recorded data obtained by recording a sound emitted by the target apparatus, and outputs a warning sound at the start of recording the sound in order to prevent confidential information from being contained in the sound recorded data.

SUMMARY

Meanwhile, a case where operation sound data is acquired by recording an operation sound of a target apparatus, and various processes related to an abnormal sound are executed in a case where the operation sound data contains the abnormal sound is considered. Although not limited to examples as follows, examples of the processes related to the abnormal sound include an abnormality detection process of detecting an abnormality (problem or the like) of a target apparatus based on an abnormal sound, a cause specifying process of specifying the cause of an abnormal sound, and an abnormal sound management process of managing (saving) operation sound data containing an abnormal sound.

Here, in a case where a target apparatus is used in a certain organization (for example, a company), the operation sound of the target apparatus is recorded to acquire operation sound data, and the operation sound data contains an abnormal sound, the operation sound data may be transmitted to an out-of-organization processing apparatus that is managed outside the organization, and the out-of-organization processing apparatus executes the process related to the abnormal sound. In such a case, in a case where the operation sound data contains a sound representing the confidential information of the organization, the confidential information is leaked to the outside of the organization. Thus, in such a case, it is required to suppress the leakage of the confidential information. The confidential information refers to information that does not open to the outside of the organization. Examples of the confidential information include confidential information possessed by the organization and privacy information regarding a person in the organization.

In addition, JP6868176B discloses that the warning sound is output at the start of recording a sound so that the sound recorded data does not contain the confidential information. However, according to JP6868176B, the warning sound is output every time the operation sound of the target apparatus is recorded, and this may be considerably troublesome. Therefore, it is required to suppress the leakage of the confidential information by another method.

Aspects of non-limiting embodiments of the present disclosure relate to an information processing apparatus, a non-transitory computer readable medium storing an information processing program, and an information processing method that suppress leakage of confidential information of an organization in a case where an out-of-organization processing apparatus executes a process related to an abnormal sound contained in operation sound data obtained by recording a sound from an operation of a target apparatus used in the organization, as compared to a case where the entirety of the operation sound data is transmitted to the out-of-organization processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: acquire operation sound data being data obtained by recording an operation sound of a target apparatus used in an organization; detect an abnormal sound from the operation sound data; and transmit partial operation sound data to an out-of-organization processing apparatus, and not transmit a portion of the operation sound data other than the partial operation sound data to the out-of-organization processing apparatus, the partial operation sound data being data that contains the abnormal sound and is a portion of the operation sound data, and the out-of-organization processing apparatus being an apparatus that is managed outside the organization and executes a process related to the abnormal sound.

BRIEF DESCRIPTION OF THE DRAWINGS

Exemplary embodiment(s) of the present invention will be described in detail based on the following figures, wherein:

FIG. 1 is a schematic diagram illustrating a configuration of an information processing system according to the present exemplary embodiment;

FIG. 2 is a schematic diagram illustrating a configuration of a target apparatus according to the present exemplary embodiment;

FIG. 3 is a diagram illustrating an example of operation sound data;

FIG. 4 is a diagram illustrating a first example of a content of a notification transmitted to a data checker;

FIG. 5 is a diagram illustrating a second example of the content of the notification transmitted to the data checker;

FIG. 6 is a diagram illustrating a third example of the content of the notification transmitted to the data checker;

DETAILED DESCRIPTION

Figure 7:
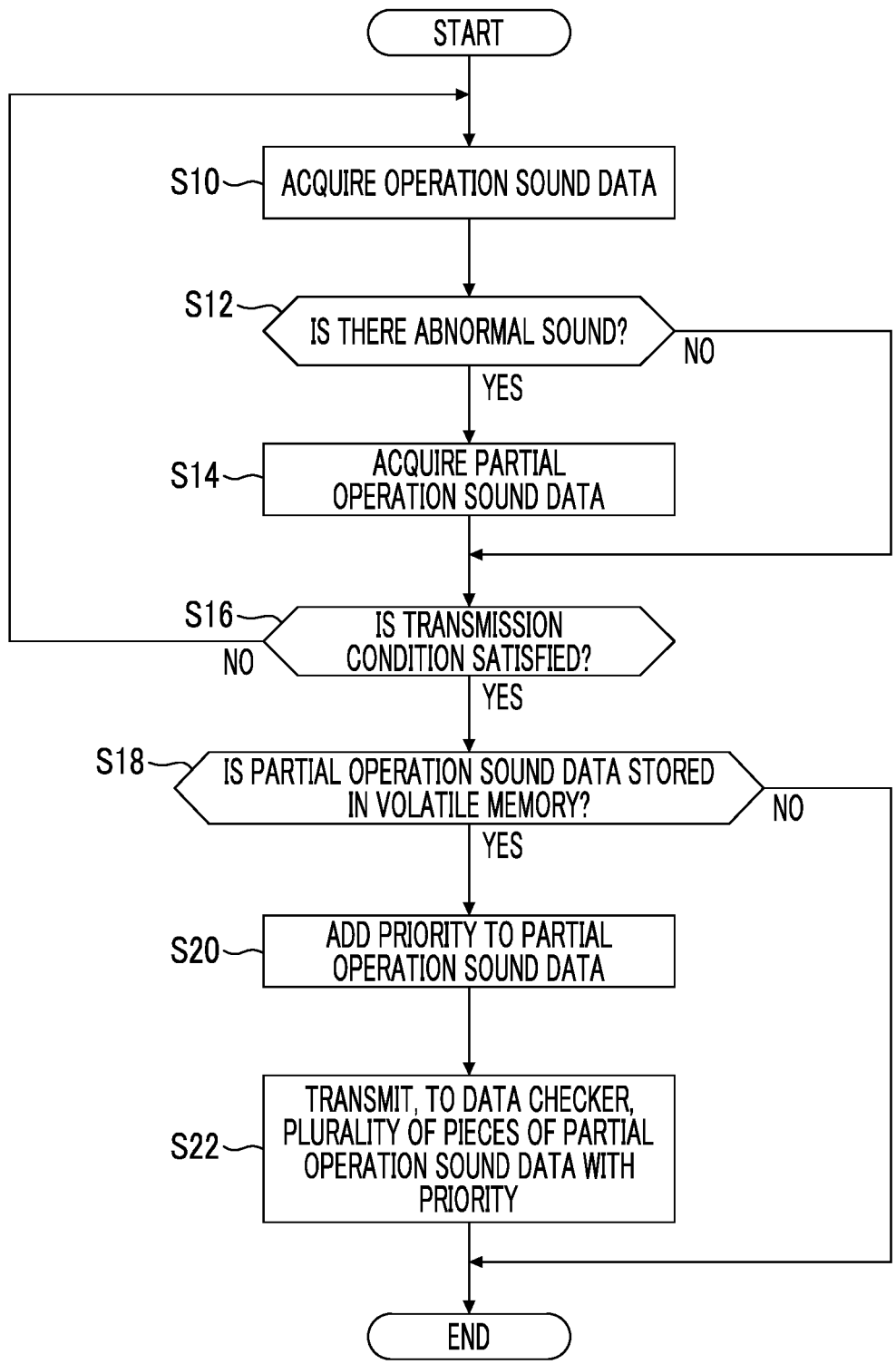
FIG. 7 is a first flowchart illustrating a processing flow of an information processing apparatus according to the present exemplary embodiment.

FIG. 1 is a schematic diagram illustrating a configuration of an information processing system 10 according to the present exemplary embodiment. The information processing system 10 includes a target apparatus 12 as an information processing apparatus, a checker terminal 14, and an out-of-organization processing apparatus 16. The target apparatus 12 and the checker terminal 14 are communicably connected to each other by an in-organization communication line 18 such as a local area network (LAN). The target apparatus 12 and the out-of-organization processing apparatus 16 are communicably connected to each other by a public communication line 20 such as a wide area network (WAN). Further, the checker terminal 14 and the out-of-organization processing apparatus 16 are also communicably connected to each other by the public communication line 20.

The target apparatus 12 is an apparatus used in a certain organization. In other words, the target apparatus 12 is installed in a certain organization. Here, the organization refers to an organization such as a company, a research institute, a government office, or a university. A portion of the organization (for example, one department or section in a company) may be provided as one organization. In particular, the organization here means an organization having confidential information. As described above, the confidential information refers to information that does not open to the outside of the organization. Examples of the confidential information include confidential information possessed by the organization and privacy information regarding a person in the organization.

The target apparatus 12 in the present exemplary embodiment is a multifunction device, a printer, or the like, but the target apparatus 12 may be any apparatus as long as the apparatus emits an operation sound. The details of the target apparatus 12 will be described later.

The checker terminal 14 is a terminal used by a data checker who checks whether or not confidential information of the organization is contained in partial operation sound data (details will be described later) that contains an abnormal sound and is a portion of operation sound data obtained by recording an operation sound of the target apparatus 12. The data checker is a person in the organization in which the target apparatus 12 is installed. For example, the data checker may be a general user who uses the target apparatus 12, or may be an administrator who manages the target apparatus 12.

The checker terminal 14 is configured by, for example, a computer such as a personal computer, a tablet terminal, or a smartphone, but is not limited to the above devices. The checker terminal 14 is configured to include a communication interface, an input interface, a display, a memory, a processor, and the like. The communication interface is provided to communicate with the target apparatus 12 through the in-organization communication line 18 or to communicate with the out-of-organization processing apparatus 16 through the public communication line 20. The input interface is provided to receive a command of the data checker. The display displays a screen or the like provided from the target apparatus 12. The memory is provided to store data. The processor executes each process.

The out-of-organization processing apparatus 16 is an apparatus that executes a process related to an abnormal sound contained in the above-described partial operation sound data. Examples of the process related to the abnormal sound, which is executed by the out-of-organization processing apparatus 16, include an abnormality detection process of detecting an abnormality (problem or the like) of the target apparatus 12 based on the abnormal sound, a cause specifying process of specifying the cause of an abnormal sound, and an abnormal sound management process of managing (saving) operation sound data containing an abnormal sound. Such a process is not limited to the above examples.

The out-of-organization processing apparatus 16 is an apparatus managed outside the organization in which the target apparatus 12 is installed. For example, in a case where the target apparatus 12 is a multifunction device or a printer, the out-of-organization processing apparatus 16 may be a server managed by the manufacturer of the target apparatus 12. The out-of-organization processing apparatus 16 is not limited to this. The out-of-organization processing apparatus 16 is configured to include a communication interface for communicating with the target apparatus 12 or the checker terminal 14 through the public communication line 20, a memory for storing partial operation sound data and the like, a processor that executes a process related to an abnormal sound contained in the partial operation sound data, and the like.

Since the out-of-organization processing apparatus 16 is an apparatus managed outside the organization, the partial operation sound data transmitted to the out-of-organization processing apparatus 16 may be heard by a person outside the organization. For example, in a case where the partial operation sound data contains confidential information (which may also be called a confidential voice) of the organization, such as a voice in a meeting in the organization, the conversation of people in the organization, and other sounds generated in the organization, this confidential information will be leaked outside the organization. In the information processing system 10 according to the present exemplary embodiment, as will be described later, leakage of the confidential information to the outside of the organization is suppressed while causing the out-of-organization processing apparatus 16 to execute the process related to the partial operation sound data of the target apparatus 12.

FIG. 2 is a schematic diagram illustrating the configuration of the target apparatus 12.

A communication interface 30 is configured to include, for example, a network interface card (NIC). The communication interface 30 exhibits a function of communicating with the checker terminal 14 through the in-organization communication line 18. In addition, the communication interface 30 exhibits a function of communicating with the out-of-organization processing apparatus 16 through the public communication line 20.

An input interface 32 is configured to include, for example, various buttons and a touch panel. The input interface 32 is used to input an instruction from a general user of the target apparatus 12 to the target apparatus 12.

A display 34 includes, for example, a liquid crystal panel and an organic electro luminescence (EL) panel. Various screens are displayed on the display 34.

A microphone 36 is installed near the target apparatus 12 and converts an operation sound of the target apparatus 12 into operation sound data which is an electric signal.

A volatile memory 38 includes a random access memory (RAM) and the like. The volatile memory 38 is a memory in which storing data is not possible unless power is supplied. In other words, in a case where the power of the target apparatus 12 is turned off and the power supply to the volatile memory 38 is cut off, data stored in the volatile memory 38 is erased. The volatile memory 38 stores one or a plurality of pieces of operation sound data 40 of the target apparatus 12, which have been acquired by the microphone 36. The operation sound data 40 contains partial operation sound data 42 which is a portion of the operation sound data 40 and contains an abnormal sound. The partial operation sound data 42 is cut out from the operation sound data 40 by a processor 46 (specifically, partial operation sound data acquisition unit 52).

A non-volatile memory 44 is configured to include a hard disk drive (HDD), a solid state drive (SSD), an embedded multimedia card (eMMC), a read only memory (ROM), and the like. The non-volatile memory 44 is a memory that can store data without supplying the power. In other words, even though the power of the target apparatus 12 is turned off and the power supply to the non-volatile memory 44 is cut off, the data stored in the non-volatile memory 44 is not erased. The non-volatile memory 44 stores an information processing program for operating each unit of the target apparatus 12. The information processing program can also be stored in a non-transitory computer readable storage medium such as a universal serial bus (USB) memory or a CD-ROM. The target apparatus 12 can read and execute the information processing program from such a storage medium.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

As illustrated in FIG. 2, the processor 46 exhibits functions as an operation sound data acquisition processing unit 48, an abnormal sound detection unit 50, a partial operation sound data acquisition unit 52, and a transmission processing unit 54, in accordance with the information processing program stored in the non-volatile memory 44. First, the processor 46 authenticates a general user by, for example, a method of reading an ID card of the user. Then, by receiving a process request (for example, a print job) from the general user, the processor 46 executes a process related to the process request. Simultaneously, the operation sound data acquisition processing unit 48, the abnormal sound detection unit 50, the partial operation sound data acquisition unit 52, and the transmission processing unit 54 sequentially execute processes.

In a case where the target apparatus 12 starts an operation (in a case where the target apparatus 12 starts the process related to the process request in the present exemplary embodiment), the operation sound data acquisition processing unit 48 records the operation sound of the target apparatus 12 with the microphone 36 to acquire operation sound data 40. The operation sound data acquisition processing unit 48 stores the acquired operation sound data 40 in the volatile memory 38. As described above, in the present exemplary embodiment, the operation sound data acquisition processing unit 48 acquires the operation sound data 40 and stores the acquired operation sound data 40 in the volatile memory 38, every time the target apparatus 12 operates. FIG. 3 illustrates an example of the operation sound data 40.

The abnormal sound detection unit 50 detects an abnormal sound N from the operation sound data 40. Various methods can be adopted as a method of detecting the abnormal sound N. For example, the abnormal sound N can be detected in a manner that normal operation sound data in a case where the target apparatus 12 normally operates is acquired in advance and is stored in the non-volatile memory 44, and the operation sound data 40 is compared to the normal operation sound data. Alternatively, the abnormal sound N may be detected by inputting the operation sound data 40 into a learning device that has been sufficiently learned to detect the abnormal sound from the operation sound data 40.

The abnormal sound detection unit 50 detects not only whether or not the operation sound data 40 contains the abnormal sound N, but also an occurrence timing (occurrence time point) of the abnormal sound N. The occurrence timing of the abnormal sound N can be represented by, for example, a time from the start time point of the operation sound data 40.

There are various types of abnormal sounds N contained in the operation sound data 40 in accordance with a form of the occurrence of the abnormal sound. For example, there are a periodic abnormal sound that occurs periodically, such as a plurality of abnormal sounds N illustrated in FIG. 3, an irregular abnormal sound that occurs irregularly, a continuous abnormal sound that occurs continuously, a single-shot abnormal sound that occurs in a single shot, and the like. The abnormal sound detection unit 50 can specify the type of the abnormal sound N contained in the operation sound data 40 based on the number of abnormal sounds N contained in the operation sound data 40, the occurrence time interval of the abnormal sound N, and the like.

For example, the abnormal sound detection unit 50 may detect the abnormal sound N from the operation sound data 40, and simultaneously (in other words, in real time), the operation sound data acquisition processing unit 48 may acquire the operation sound data 40.

The partial operation sound data acquisition unit 52 executes a process of cutting out the partial operation sound data 42, which is a portion of the operation sound data 40 and contains the abnormal sound N detected by the abnormal sound detection unit 50, from the operation sound data 40. In the present exemplary embodiment, the partial operation sound data acquisition unit 52 acquires a portion having a predetermined time length T from the occurrence timing of the abnormal sound N, as the partial operation sound data 42. For example, in the example in FIG. 3, a portion of the time length T from the occurrence timing t1 of the first abnormal sound N contained in the operation sound data 40 is acquired as the partial operation sound data 42.

The time length T of the partial operation sound data 42 may be predetermined by the administrator of the target apparatus 12 or the like. From the viewpoint of suppressing the leakage of confidential information of the organization, for example, the time length T is required to be as short as possible. However, in a case where the time length T is too short, it may not be possible that the out-of-organization processing apparatus 16 executes the cause specifying process of specifying the cause of the abnormal sound N. Thus, the time length T may be, for example, a time required to specify the cause of the abnormal sound N contained in the partial operation sound data 42 (for example, more preferably a necessary and sufficient time).

The time required to specify the cause of the abnormal sound N contained in the partial operation sound data 42 may differ depending on the type of the abnormal sound contained in the partial operation sound data 42. For example, for the periodic abnormal sound, it is appropriate that the abnormal sound N for a plurality of cycles is contained in the partial operation sound data 42. Thus, the time length T may be set to a time including, for example, a plurality of cycles. For example, in a case where the periodic abnormal sound occurs at 1-second intervals, the time length T can be set to about 8 seconds (8 cycles). On the other hand, since there is no periodicity for the irregular abnormal sound, the continuous abnormal sound, and the single-shot abnormal sound, the time length T can be set to a time shorter than the time length T for the periodic abnormal sound, for example, set to about 1 second. As described above, the time length T of the partial operation sound data 42 may be, for example, a time corresponding to the type of the abnormal sound N contained in the operation sound data 40.

A time length table in which the type of abnormal sound N contained in the operation sound data 40 and the time length T of the partial operation sound data 42 are associated with each other is prepared in advance and stored in the non-volatile memory 44. The partial operation sound data acquisition unit 52 specifies the time length T based on the time length table and the type of the abnormal sound N contained in the operation sound data 40 specified by the abnormal sound detection unit 50. The partial operation sound data acquisition unit 52 acquires the partial operation sound data 42 having the specified time length T.

There is also considered a case where it is not possible to acquire the partial operation sound data 42 having the predetermined time length T, for example, a case where the time length of the operation sound data 40 is short. In this case, the partial operation sound data acquisition unit 52 may use, as the partial operation sound data 42, a portion from the occurrence timing of the abnormal sound N to the end of the operation sound data 40.

The transmission processing unit 54 transmits the partial operation sound data 42 acquired by the partial operation sound data acquisition unit 52 to the data checker. As described above, the data checker may be a general user who has input a process request to the target apparatus 12, or may be an administrator who manages the target apparatus 12. The data checker checks whether the partial operation sound data 42 contains the confidential information of the organization, and then transmits the partial operation sound data 42 to the out-of-organization processing apparatus 16. On the other hand, the transmission processing unit 54 does not transmit a portion of the operation sound data 40 acquired by the operation sound data acquisition processing unit 48, other than the partial operation sound data 42 to the data checker. That is, in the present exemplary embodiment, the portion of the operation sound data 40 other than the partial operation sound data 42 does not leak to the target apparatus 12.

One aspect of transmitting the partial operation sound data 42 to the data checker is to transmit the partial operation sound data 42 to the checker terminal 14 used by the data checker. The transmission processing unit 54 can transmit a notification including the partial operation sound data 42 to the checker terminal 14. In the present exemplary embodiment, an e-mail having the partial operation sound data 42 as an attached file is transmitted to the data checker as the notification. Such a notification may have a form other than the e-mail.

The data checker receives the e-mail on the checker terminal 14, and thereby the checker terminal 14 receives the partial operation sound data 42. In a case where the data checker is a general user, a user DB (database) in which a user ID for uniquely identifying the general user and an e-mail address of the user are associated with each other can be stored in a server or the like accessible from the target apparatus 12. The transmission processing unit 54 can acquire the e-mail address of the general user based on the user DB and the user ID obtained in a case where the general user has been authenticated. Even though the data checker is an administrator, an e-mail address of the administrator can be registered in a server or the like accessible from the target apparatus 12. The transmission processing unit 54 accesses the server or the like to acquire the e-mail address of the administrator.

FIG. 4 is a diagram illustrating a first example of the content of the notification transmitted to the data checker. The body of the e-mail as the notification illustrated in FIG. 4 includes a message indicating that an abnormal sound N has occurred in the target apparatus 12, a required to check whether or not that the attached partial operation sound data 42 contains confidential information of the organization, a required to transmit the partial operation sound data 42 to the out-of-organization processing apparatus 16 in a case where the partial operation sound data 42 does not contain the confidential information of the organization, and a transmission destination of the partial operation sound data 42 (e-mail address of the out-of-organization processing apparatus 16, a uniform resource locator (URL) of a registration destination, or the like). That is, the notification transmitted to the data checker can be information for transmitting the partial operation sound data 42 to the out-of-organization processing apparatus 16 in a state where the data checker is caused to check the partial operation sound data 42.

The data checker listens to the attached partial operation sound data 42 in accordance with the e-mail transmitted from the transmission processing unit 54, and checks whether or not the partial operation sound data 42 contains the confidential information of the organization. In a case where the partial operation sound data 42 does not contain the confidential information of the organization, the partial operation sound data 42 is transmitted from the checker terminal 14 to the transmission destination (that is, the out-of-organization processing apparatus 16) described in the e-mail.

The out-of-organization processing apparatus 16 that has received the partial operation sound data 42 executes a process related to the abnormal sound N contained in the partial operation sound data 42. A serviceman or the like who performs maintenance of the target apparatus 12 is notified of the result of the process.

Another aspect of transmitting the partial operation sound data 42 to the data checker is to notify the data checker of a link destination (storage location) of the partial operation sound data 42 and to cause the data manager to access the link destination and acquire (download) the partial operation sound data 42. For example, the transmission processing unit 54 transmits a notification (for example, e-mail) indicating the link destination for the partial operation sound data 42 stored in the volatile memory 38, to the data checker. Alternatively, the transmission processing unit 54 transmits and stores the partial operation sound data 42 to an in-organization server managed in the organization, and then transmits, to the data checker, the information indicating the link destination of the partial operation sound data 42 stored in the in-organization server. The data checker downloads the partial operation sound data 42 to the checker terminal 14 based on the information indicating the link destination.

In the above-described exemplary embodiment, the transmission processing unit 54 transmits the partial operation sound data 42 to the data checker, and the data checker transmits the partial operation sound data 42 to the out-of-organization processing apparatus 16. The transmission processing unit 54 may directly transmit the partial operation sound data 42 to the out-of-organization processing apparatus 16. Also in this case, the transmission processing unit 54 does not transmit the portion of the operation sound data 40 acquired by the operation sound data acquisition processing unit 48, other than the partial operation sound data 42, to the out-of-organization processing apparatus 16.

Further, the transmission processing unit 54 may transmit the partial operation sound data 42 to the data checker, and transmit the partial operation sound data 42 to the out-of-organization processing apparatus 16 in response to the notification from the data checker who has checked that the partial operation sound data 42 does not contain the confidential information of the organization. For example, the transmission processing unit 54 transmits the notification of the content as illustrated in FIG. 5 to the data checker. The notification contains the occurrence of the abnormal sound N in the target apparatus 12, a request to check whether the attached partial operation sound data 42 contains the confidential information of the organization, a response request in a case where the partial operation sound data 42 does not contain the confidential information of the organization, and a link destination of the partial operation sound data 42. Meanwhile, "YYaaa.bb.com" in the link destination indicates a folder path in the target apparatus 12. An e-mail having the attached partial operation sound data 42 may be transmitted to the data checker as the notification.

The data checker downloads the partial operation sound data 42 to the checker terminal 14 from the link destination contained in the notification, and checks the partial operation sound data 42. As a result, in a case where the data checker determines that the partial operation sound data 42 does not contain the confidential information of the organization, the data checker operates a transmit button contained in the notification. In a case where the transmit button is operated, a check notification is transmitted from the checker terminal 14 to the target apparatus 12. The transmission processing unit 54 transmits the partial operation sound data 42 to the out-of-organization processing apparatus 16 in response to reception of the check notification. On the other hand, in a case where the data checker determines that the partial operation sound data 42 contains the confidential information of the organization, the data checker operates a cancel button contained in the notification. In a case where the cancel button is operated, a cancellation notification is transmitted from the checker terminal 14 to the target apparatus 12. In a case where the transmission processing unit 54 receives the cancellation notification, the transmission processing unit 54 does not transmit the partial operation sound data 42 to the out-of-organization processing apparatus 16.

As described above, in the present exemplary embodiment, the transmission processing unit 54 transmits not the entirety of the operation sound data 40 but only the partial operation sound data 42 being a portion of the operation sound data 40 to the data checker or the out-of-organization processing apparatus 16. Thus, as compared with at least a case where the entirety of the operation sound data 40 is transmitted to the data checker or the out-of-organization processing apparatus 16, the occurrence of a situation in which the confidential information of the organization which is contained in the operation sound data 40 is leaked to the outside of the organization is suppressed. For example, even though the portion of the operation sound data 40 other than the partial operation sound data 42 contains the confidential information of the organization, in a case where the partial operation sound data 42 does not contain the confidential information of the organization, the confidential information is not leaked to the outside of the organization. In particular, by the data checker checking the partial operation sound data 42 before the partial operation sound data 42 is transmitted to the out-of-organization processing apparatus 16, the occurrence of the situation in which the confidential information of the organization which is contained in the operation sound data 40 is leaked to the outside of the organization is more suppressed.

Further, since the operation sound data 40 is stored in the volatile memory 38, the operation sound data 40 is erased in a case where the power of the target apparatus 12 is turned off. Thus, an occurrence of a situation in which the operation sound data 40 is leaked to the outside of the target apparatus 12, in particular, to the outside of the organization is suppressed.

As described above, in the present exemplary embodiment, the operation sound data acquisition processing unit 48 acquires the operation sound data 40 every time the target apparatus 12 operates. Thus, in a case where the target apparatus 12 has a problem, a notification is transmitted to the data checker (general user or administrator) every time the target apparatus 12 operates. In a case where the notification is transmitted, particularly for the administrator, it is required to check the partial operation sound data 42 every time receiving the notification, and this may take the large time and effort.

Considering this point, in a case where the partial operation sound data acquisition unit 52 accumulates and stores the acquired partial operation sound data 42 in the volatile memory 38, and the transmission processing unit 54 satisfies a predetermined transmission condition, for example, in a state where a priority is added to a plurality of pieces of partial operation sound data 42 stored in the volatile memory 38, the plurality of pieces of partial operation sound data 42 having the priority may be transmitted to the data checker.

Even in this case, the above description is similar to the above exemplary embodiment in that, every time the target apparatus 12 operates, the operation sound data acquisition processing unit 48 acquires operation sound data 40 and stores the operation sound data 40 in the volatile memory 38, the abnormal sound detection unit 50 detects an abnormal sound N from the operation sound data 40, and the partial operation sound data acquisition unit 52 acquires partial operation sound data 42 containing the abnormal sound N, from the operation sound data 40. However, the transmission processing unit 54 does not immediately transmit the partial operation sound data 42 to the data checker, and stores the partial operation sound data 42 in the volatile memory 38 until the transmission condition is satisfied. Thus, until the transmission condition is satisfied, the partial operation sound data acquisition unit 52 may acquire a plurality of pieces of partial operation sound data 42, and the plurality of pieces of partial operation sound data 42 may be stored in the volatile memory 38.

The transmission condition may be predetermined by the administrator of the target apparatus 12 or the like.

Examples of the transmission conditions include a case where the time has reached a time point designated in advance, or a case where a predetermined amount (number or data volume) of partial operation sound data 42 is stored in the volatile memory 38, but the present exemplary embodiment is not limited to this.

Further, in a case where the transmission condition is satisfied, the transmission processing unit 54 adds a priority to a plurality of pieces of partial operation sound data 42 stored in the volatile memory 38. The priority here indicates the order in which the data checker is to check the data. Specifically, the transmission processing unit 54 adds the priority to each piece of partial operation sound data 42 based on at least one of a sound volume of the abnormal sound N contained in the partial operation sound data 42, a data volume of the partial operation sound data 42, or the occurrence time point of the abnormal sound N.

The sound volume of the abnormal sound N may be a peak-to-peak sound pressure level P of the abnormal sound N in a sound wave form (see FIG. 3) of the partial operation sound data 42. Generally, the larger the sound volume (sound pressure level P) of the abnormal sound N, the easier it is to execute the process related to the abnormal sound N. Thus, the larger sound volume of the abnormal sound N acts in a direction of higher priority.

In the present exemplary embodiment, the operation sound data 40 or the partial operation sound data 42 is in a predetermined file format (for example, a wav format). Therefore, the data volume of the partial operation sound data 42 may indicate the time length T of the partial operation sound data 42. In general, the longer the time length T, the easier it is to execute the process related to the abnormal sound N. Thus, the longer time length T acts in the direction of higher priority.

Further, in many cases, it is intended to give priority to a process related to the abnormal sound N that has occurred earlier in time. Therefore, a case where the occurrence time point of the abnormal sound N is earlier in time acts in the direction of the higher priority.

The transmission processing unit 54 may add the priority to each piece of partial operation sound data 42 in consideration of at least two of the sound volume of the abnormal sound N contained in the partial operation sound data 42, the data volume of the partial operation sound data 42, or the occurrence time point of the abnormal sound N. In this case, the priority of each piece of partial operation sound data 42 may be specified in consideration of the weight added to each of parameters of the sound volume of the abnormal sound N, the data volume of the partial operation sound data 42, and the occurrence time point of the abnormal sound N.

The transmission processing unit 54 transmits the plurality of pieces of partial operation sound data 42 with the priority to the data checker. For example, the transmission processing unit 54 transmits the notification of the content as illustrated in FIG. 6 to the data checker. The notification includes the occurrence of the abnormal sound N in the target apparatus 12, a request to check whether or not the attached partial operation sound data 42 contains the confidential information of the organization, a request to transmit the partial operation sound data 42 to the out-of-organization processing apparatus 16 in a case where the partial operation sound data 42 does not contain the confidential information of the organization, the priorities and link destinations of a plurality of pieces of partial operation sound data 42, and information indicating that one piece of partial operation sound data 42 may be transmitted to the out-of-organization processing apparatus 16. A plurality of pieces of partial operation sound data 42 may also be attached to the notification, and this notification may be transmitted to the checker terminal 14.

The data checker checks whether or not the partial operation sound data 42 contains the confidential information of the organization, based on this notification in order indicated by the priority. In a case where the data checker checks that the partial operation sound data 42 does not contain the confidential information, it is not necessary for the data checker to check the partial operation sound data 42 having a priority lower than the priority of such partial operation sound data that does not contain the confidential information. That is, the time and effort of the data checker is reduced as compared with a case where the partial operation sound data 42 is individually transmitted. The data checker transmits the partial operation sound data 42 checked not to contain the confidential information, to the out-of-organization processing apparatus 16.

Further, even in the exemplary embodiment in which the partial operation sound data 42 is directly transmitted from the target apparatus 12 to the out-of-organization processing apparatus 16, in a case where a problem has occurred in the target apparatus 12, the partial operation sound data 42 is transmitted to the out-of-organization processing apparatus 16 every time the target apparatus 12 operates. In a case where the partial operation sound data 42 is transmitted to the out-of-organization processing apparatus 16 every time the target apparatus 12 operates, a probability that the partial operation sound data 42 containing the confidential information of the organization is transmitted to the out-of-organization processing apparatus 16 may increase.

Considering this point, in a case where the partial operation sound data acquisition unit 52 accumulates and stores the acquired partial operation sound data 42 in the volatile memory 38, and the transmission processing unit 54 satisfies a predetermined transmission condition, for example, the priority may be added to the plurality of pieces of partial operation sound data 42 stored in the volatile memory 38, and the partial operation sound data 42 selected in accordance with the priority among the plurality of pieces of partial operation sound data 42 may be transmitted to the out-of-organization processing apparatus 16.

Specifically, every time the target apparatus 12 operates, the operation sound data acquisition processing unit 48 acquires the operation sound data 40 and stores the operation sound data 40 in the volatile memory 38, the abnormal sound detection unit 50 detects the abnormal sound N from the operation sound data 40, and the partial operation sound data acquisition unit 52 acquires the partial operation sound data 42 containing the abnormal sound N, from the operation sound data 40. The transmission processing unit 54 does not immediately transmit the partial operation sound data 42 to the data checker, and stores the partial operation sound data 42 in the volatile memory 38 until the transmission condition is satisfied. Thus, until the transmission condition is satisfied, the partial operation sound data acquisition unit 52 may acquire a plurality of pieces of partial operation sound data 42, and the plurality of pieces of partial operation sound data 42 may be stored in the volatile memory 38.

In a case where the transmission condition is satisfied, as described above, the transmission processing unit 54 adds the priority to each piece of partial operation sound data 42 based on at least one of the sound volume of the abnormal sound N contained in the partial operation sound data 42, the data volume of the partial operation sound data 42, or the occurrence time point of the abnormal sound N. The priority here indicates the order in which the transmission processing unit 54 is to perform transmission to the out-of-organization processing apparatus 16. The transmission processing unit 54 transmits, to the out-of-organization processing apparatus 16, the partial operation sound data 42 selected based on the priority added to each piece of partial operation sound data 42 among the plurality of pieces of partial operation sound data 42 stored in the volatile memory 38. Typically, the transmission processing unit 54 transmits only the partial operation sound data 42 having the highest priority to the out-of-organization processing apparatus 16.

Even in this case, the transmission processing unit 54 may transmit the plurality of pieces of partial operation sound data 42 with the priority to the data checker, and may transmit the instructed partial operation sound data 42 to the out-of-organization processing apparatus 16 in response to a notification indicating the partial operation sound data 42 to be transmitted to the out-of-organization processing apparatus 16, which is transmitted from the data checker who has checked that one or the plurality of pieces of partial operation sound data 42 do not contain the confidential information of the organization, in accordance with the priority added to each piece of partial operation sound data 42.

The configuration of the information processing system 10 according to the present exemplary embodiment is as described above. The processing flow of the target apparatus 12 according to the present exemplary embodiment will be described below with reference to the flowchart illustrated in FIGS. 7 and 8.

FIG. 7 is a flowchart illustrating a processing flow of the target apparatus 12 in the exemplary embodiment in which the transmission processing unit 54 transmits the partial operation sound data 42 to the data checker, and the data checker transmits the partial operation sound data 42 to the out-of-organization processing apparatus 16.

In Step S10, in a case where the processor 46 receives a process request from a general user, and starts a process related to the received process request, the operation sound data acquisition processing unit 48 records an operation sound of the target apparatus 12 to acquire operation sound data 40 and stores the operation sound data 40 in the volatile memory 38.

In Step S12, the abnormal sound detection unit 50 determines whether or not an abnormal sound N is contained in the operation sound data 40 acquired in Step S10. In a case where the abnormal sound N is detected from the operation sound data 40, the process proceeds to Step S14. In a case where the abnormal sound N is not detected, the process bypasses Step S14 and proceeds to Step S16.

In Step S14, the partial operation sound data acquisition unit 52 acquires partial operation sound data 42 by cutting out the partial operation sound data 42 containing the abnormal sound N detected in Step S12, from the operation sound data 40. Then, the partial operation sound data acquisition unit 52 stores the acquired partial operation sound data 42 in the volatile memory 38.

In Step S16, the transmission processing unit 54 determines whether or not the transmission condition is satisfied. In a case where the transmission condition is not satisfied, the process returns to Step S10. In a case where the target apparatus 12 restarts the operation, the processes of Steps S10 to S16 are repeated. As a result, a plurality of pieces of partial operation sound data 42 may be stored in the volatile memory 38. In a case of acquiring the partial operation sound data 42, the transmission processing unit 54 may immediately transmit the partial operation sound data 42 to the data checker.

In Step S18, the transmission processing unit 54 determines whether or not the partial operation sound data 42 is stored in the volatile memory 38. In a case where the transmission condition is that the time has reached a predetermined time point, and the target apparatus 12 has never operated during a period to the predetermined time point, that is, in a case where the partial operation sound data 42 is not stored in the volatile memory 38, the process is ended. In a case where the partial operation sound data 42 is stored in the volatile memory 38, the process proceeds to Step S20.

In Step S20, the transmission processing unit 54 adds a priority to each piece of partial operation sound data 42 stored in the volatile memory 38 based on at least one of the sound volume of the abnormal sound N contained in the partial operation sound data 42, the data volume of the partial operation sound data 42, or the occurrence time point of the abnormal sound N.

In Step S22, the transmission processing unit 54 transmits a plurality of pieces of partial operation sound data 42 with the priority to the data checker. Then, the data checker checks whether or not the partial operation sound data 42 contains the confidential information of the organization in the order indicated by the priority, and transmits the partial operation sound data 42 checked not to contain the confidential information, to the out-of-organization processing apparatus 16.

Figure 8:
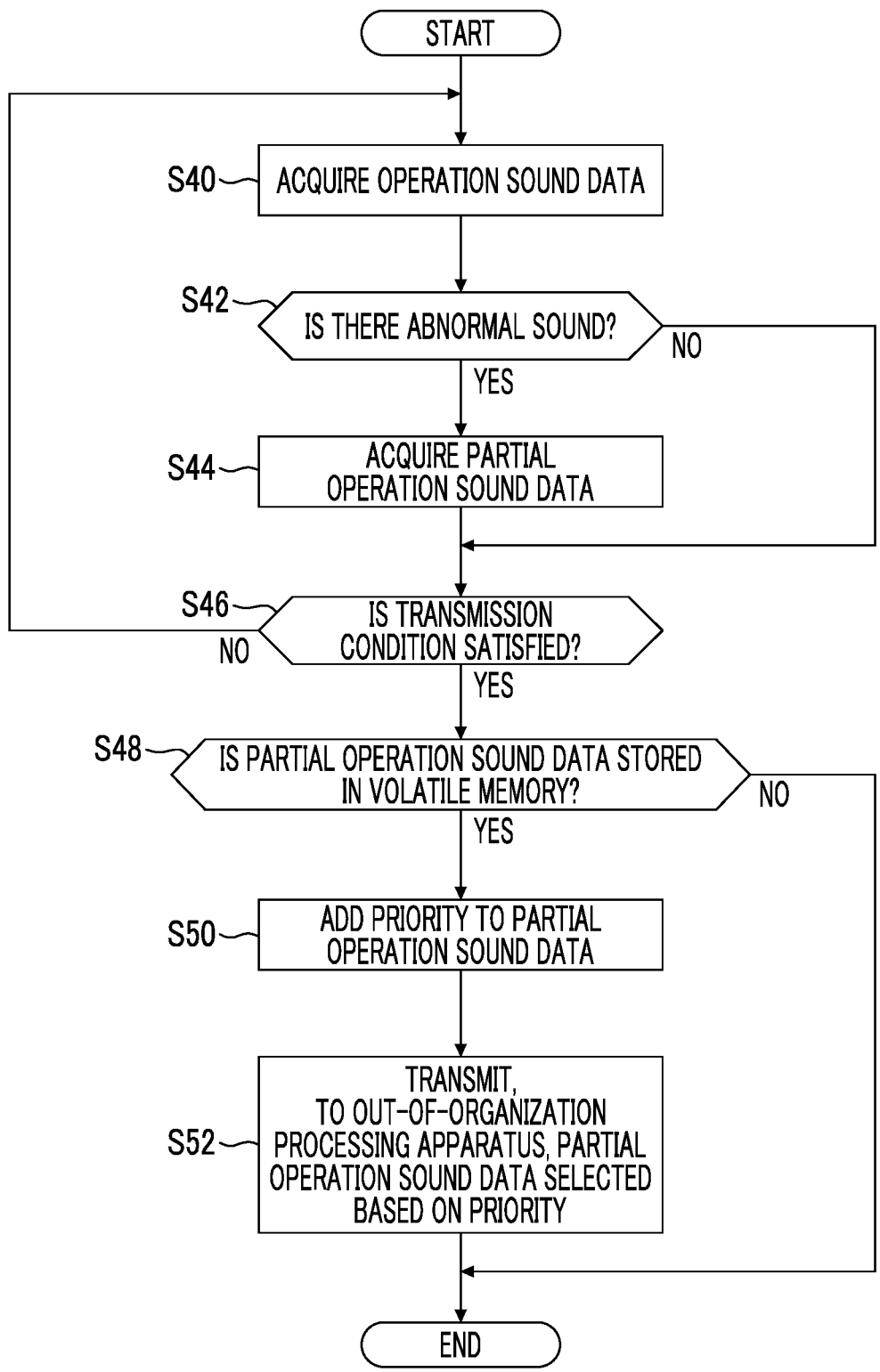
FIG. 8 is a second flowchart illustrating the processing flow of the information processing apparatus according to the present exemplary embodiment.

FIG. 8 is a flowchart illustrating a processing flow of the target apparatus 12 in the exemplary embodiment in which the transmission processing unit 54 directly transmits the partial operation sound data 42 to the out-of-organization processing apparatus 16. Processes of Steps S40 to S50 in the flowchart illustrated in FIG. 8 are identical to the processes of Steps S10 to S20 in the flowchart illustrated in FIG. 7. Thus, the repetitive description will be omitted here.

In Step S52, the transmission processing unit 54 transmits, to the out-of-organization processing apparatus 16, the partial operation sound data 42 selected based on the priority added to each piece of partial operation sound data 42 in Step S50 among a plurality of pieces of partial operation sound data 42 stored in the volatile memory 38. Typically, the transmission processing unit 54 transmits only the partial operation sound data 42 having the highest priority to the out-of-organization processing apparatus 16.

Hitherto, the exemplary embodiment of the present invention has been described, but the exemplary embodiment of the present invention is not limited to the above exemplary embodiment, and various modifications may be made without departing from the spirit of the present invention.

For example, in the above exemplary embodiment, the target apparatus 12 is an information processing apparatus, and the target apparatus 12 has the functions as the operation sound data acquisition processing unit 48, the abnormal sound detection unit 50, the partial operation sound data acquisition unit 52, and the transmission processing unit 54. Another apparatus other than the target apparatus 12 may have such functions. For example, an in-organization server that is communicably connected to the target apparatus 12 and is managed in the organization may have the functions as the operation sound data acquisition processing unit 48, the abnormal sound detection unit 50, the partial operation sound data acquisition unit 52, and the transmission processing unit 54. In this case, the in-organization server corresponds to the information processing apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
   acquire operation sound data being data obtained by recording an operation sound of a target apparatus used in an organization;
   detect an abnormal sound from the operation sound data; and
   transmit partial operation sound data to an out-of-organization processing apparatus, and not transmit a portion of the operation sound data other than the partial operation sound data to the out-of-organization processing apparatus, the partial operation sound data being data that contains the abnormal sound and is a portion of the operation sound data, and the out-of-organization processing apparatus being an apparatus that is managed outside the organization and executes a process related to the abnormal sound.

2. The information processing apparatus according to claim 1, wherein the processor is configured to:
   transmit the partial sound data to a data checker who transmits the partial operation sound data to the out-of-organization processing apparatus after checking the partial operation sound data, and
   transmit the partial operation sound data to the out-of-organization processing apparatus in response to a notification from the data checker who has checked that confidential information of the organization is not contained in the partial operation sound data.

3. The information processing apparatus according to claim 1, wherein the processor is configured to:
   acquire a plurality of pieces of the operation sound data and acquire a plurality of pieces of the partial operation sound data, each being a portion of each piece of the operation sound data, and
   transmit, to the out-of-organization processing apparatus, the partial operation sound data selected based on at least one of a sound volume of the abnormal sound, a data volume of the partial operation sound data, or an occurrence time point of the abnormal sound, among the plurality of pieces of the partial operation sound data.

4. The information processing apparatus according to claim 1,
wherein a time length of the partial operation sound data is a time required to specify a cause of the abnormal sound.

5. The information processing apparatus according to claim 1,
wherein a time length of the partial operation sound data is a time corresponding to a type of the abnormal sound.

6. A non-transitory computer readable medium storing an information processing program causing a computer to execute a process comprising:
   acquiring operation sound data being data obtained by recording an operation sound of a target apparatus used in an organization;
   detecting an abnormal sound from the operation sound data; and
   transmitting partial operation sound data to an out-of-organization processing apparatus, and not transmitting a portion of the operation sound data other than the partial operation sound data to the out-of-organization processing apparatus, the partial operation sound data being data that contains the abnormal sound and is a portion of the operation sound data, and the out-of-organization processing apparatus being an apparatus that is managed outside the organization and executes a process related to the abnormal sound.

7. An information processing apparatus comprising:
acquiring operation sound data being data obtained by recording an operation sound of a target apparatus used in an organization;
detecting an abnormal sound from the operation sound data; and
transmitting partial operation sound data to an out-of-organization processing apparatus, and not transmit a portion of the operation sound data other than the partial operation sound data to the out-of-organization processing apparatus, the partial operation sound data being data that contains the abnormal sound and is a portion of the operation sound data, and the out-of-organization processing apparatus being an apparatus that is managed outside the organization and executes a process related to the abnormal sound.

* * * * *